United States Patent [19]

Jensen

[11] 4,032,192

[45] June 28, 1977

[54] LATCHING MECHANISM FOR REAR GATE OF DUMP VEHICLE WITH AUTOMATIC TILT RELEASE

[75] Inventor: Robert Eugene Jensen, Tennant, Iowa

[73] Assignee: Leonard M. Brannan, Omaha, Nebr.; a part interest

[22] Filed: Jan. 5, 1976

[21] Appl. No.: 646,598

[52] U.S. Cl. .............................................. 298/23 A
[51] Int. Cl.² ........................................... B61D 9/02
[58] Field of Search ................. 298/38, 23 R, 23 S, 298/23 A, 23 B, 23 F, 23 DF; 214/501

[56] References Cited

UNITED STATES PATENTS

| | | | |
|---|---|---|---|
| 1,554,509 | 9/1925 | Kearney | 298/38 X |
| 1,712,534 | 5/1929 | Walsh et al. | 298/23 A X |
| 1,792,680 | 2/1931 | Dewey | 298/23 R |
| 1,883,473 | 10/1932 | Barrett | 298/23 R X |
| 2,410,046 | 10/1946 | Burns | 298/23 S |
| 2,935,350 | 5/1960 | Bestrom | 298/23 R X |

Primary Examiner—Frank E. Werner
Attorney, Agent, or Firm—Tilton, Fallon, Lungmus, Chestnut & Hill

[57] ABSTRACT

A latching mechanism for the rear gate of a dump vehicle is automatically released when the box is tilted rearwardly. The gate is hinged at the top so that when the release mechanism is actuated, the gate swings open and the contents may be discharged while the vehicle is still moving.

7 Claims, 5 Drawing Figures

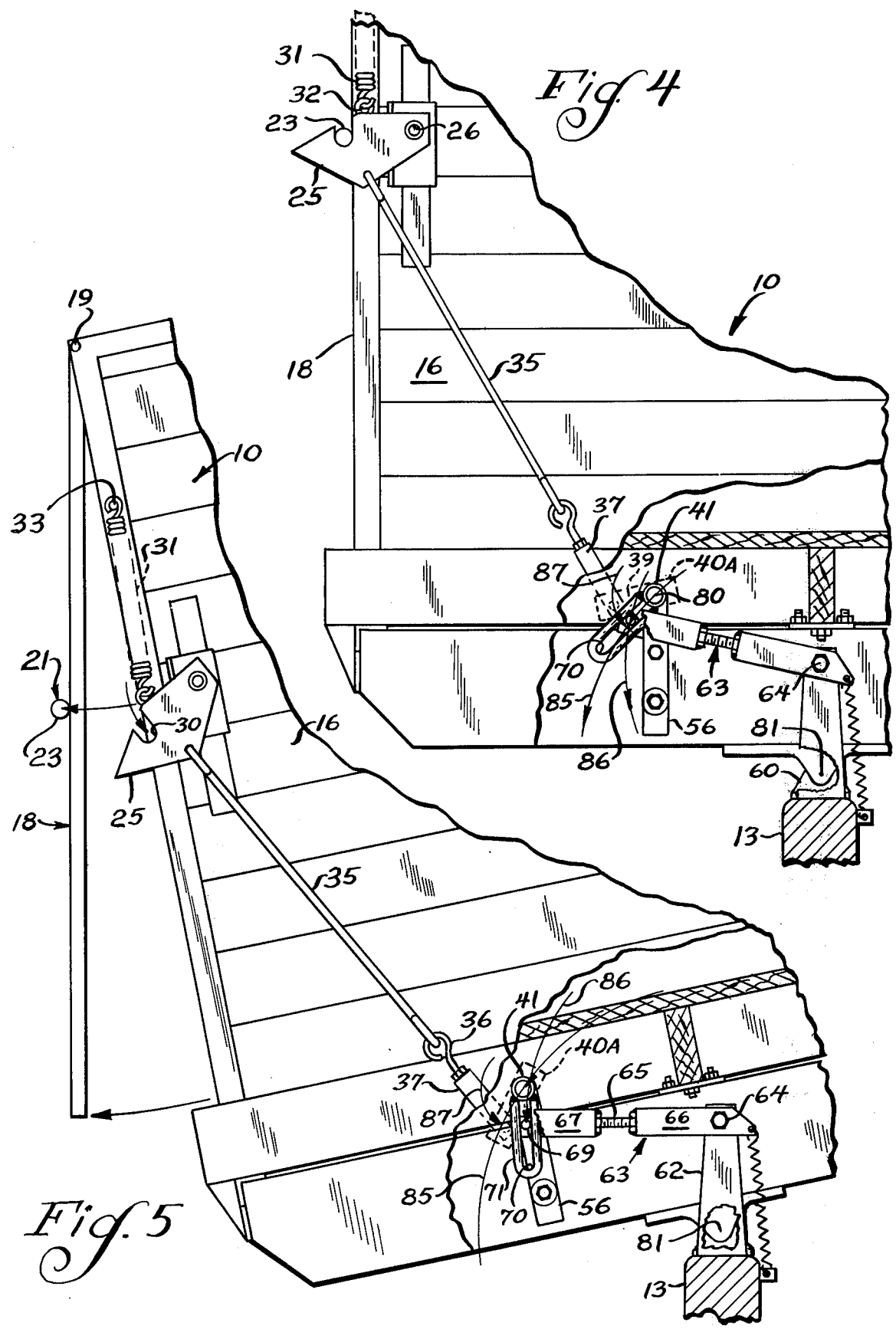

LATCHING MECHANISM FOR REAR GATE OF DUMP VEHICLE WITH AUTOMATIC TILT RELEASE

BACKGROUND AND SUMMARY

The present invention relates to dump vehicles in general, and more particularly, it relates to a latching mechanism for the rear gate of the box of a dump vehicle with an automatic tilt release. Such vehicles (called dump wagons) are used in agriculture for collecting forage, for example, from the remainder of crops left in the field after harvesting with a combine. It is desired that the box be general closed (that is, have four enclosing sidewalls and a bottom) for collecting purposes, and that the rear wall of the box be a gate which may be opened for discharging its contents.

In the past, the gate of these agricultural dump wagons has been hinged at its upper side for swinging rearwardly relative to the box when the box is tilted. Typically, the rear gate is locked with a conventional latch and chains, thereby requiring that the operator get down from the tractor pulling the wagon to unchain and unlatch the gate before the box is tilted. After the collected material is discharged, he must again dismount the tractor and lock and chain the gate for further use.

It will be appreciated that the area in which the collected forage is dumped normally has a large quantity of organic material lying in the forage storage area which frequently is soft, particularly when wet. When a farmer brings the dump wagon into the area and stops it to unlatch and unchain the rear gate, he frequently has difficulty obtaining enough traction to move the wagon which, of course, is weighted down by the collected forage.

The present invention, by providing an automatic tilt release for the latching mechanism for the rear gate of the box thus not only provides convenience for the operator in not having to get down off the tractor before and after discharging the collected material, but it enables him to discharge the contents of the box while the tractor is still in motion, thereby obviating the problem of getting stuck in the soft forage in the discharge area.

The latching mechanism of the present invention includes a latch which is pivotally mounted to the side of the box of the dump wagon for movement between an open or release position and the latching position. A spring biases the latch to the latching position wherein the latch engages a rod or bolt mounted to the hinged rear gate of the box. A shaft is rotatably mounted beneath the box and extends transverse of it. A first link is connected between the shaft and the latch for moving the latch from the latching position to the open position when the shaft is rotated. A second or actuator link is connected between the frame of the vehicle and the rotatable shaft for rotating the shaft when the box is tilted rearwardly. This action, upon rotating the shaft, moves the latch to the open position and releases the rear gate as the box is tilted rearwardly about the frame. Because of the particular arrangement of the preferred embodiment as disclosed in more detail within, there is provided a very quick release of the latching mechanism upon initial tilt of the box, and this is highly advantageous in that the rear gate is permitted to swing open as soon as the box is tilted. This prevents the load from falling against the rear gate and interfering with the automatic release mechanism.

Thus, with the present invention, a farmer may pull the dump wagon through the area where he intends to deposit the collected material, and without stopping the tractor, cause the box to dump. Immediately upon tilt, the latch mechanism releases, and further tilting of the box causes the gate to open and the contents to be discharged without having to stop the forward motion of the tractor and wagon.

Other features and advantages will be apparent to persons skilled in the art from the following detailed description of a preferred embodiment accompanied by the attached drawing wherein identical reference numerals are used to refer to like parts in the various views.

THE DRAWING

FIG. 4 is a fragmentary right side view of the apparatus of FIG. 1 with portions of the right side cut away to see the actuator link, and with the latch member in the latching position; and FIG. 5 is a view similar to FIG. 4 with the dump box tilted rearwardly for discharge, and the latch member in the open position.

DETAILED DESCRIPTION

In the illustrated embodiment, the invention is shown as incorporated in an agricultural dump wagon, but persons skilled in the art will appreciate that it is also useful on other dump vehicles, such as dump trucks.

Figure 1:
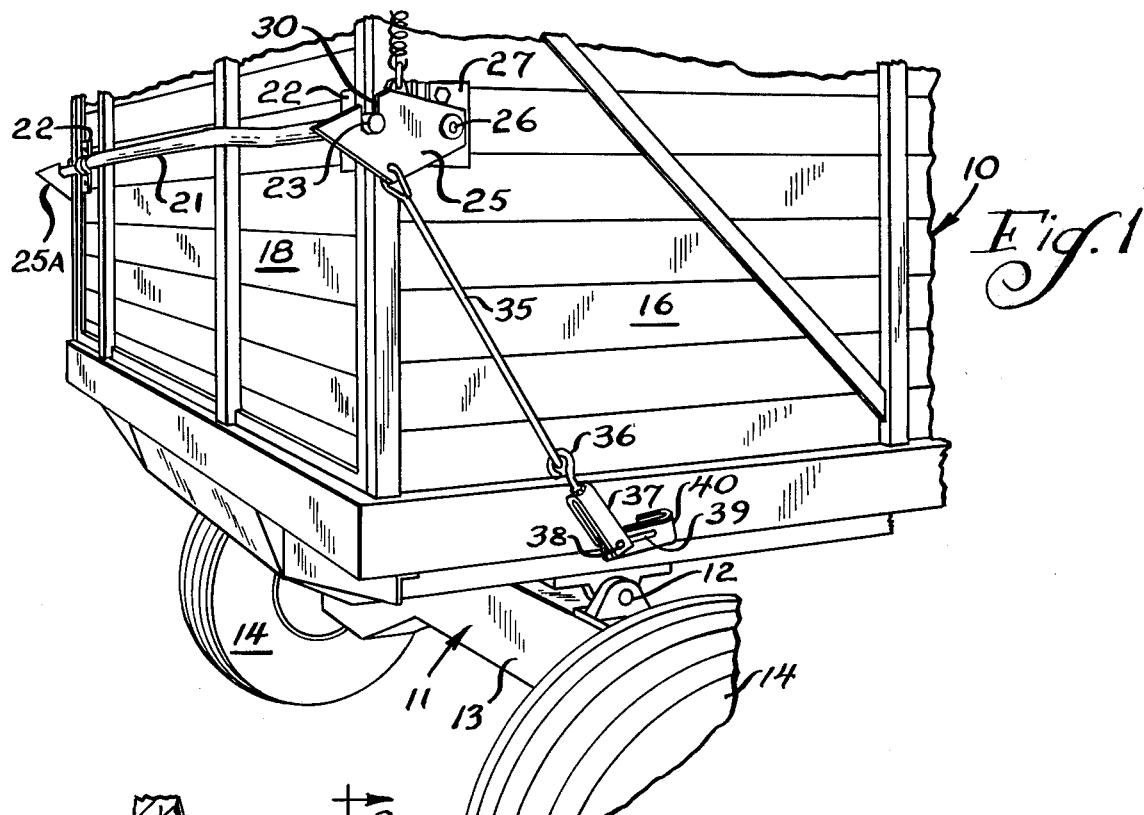
FIG. 1 is a perspective cutaway view, taken from the rear right side, of a dump wagon incorporating the present invention.

Referring then first to FIG. 1, there is seen, in fragamentary form the lower rear portion of an agricultural dump wagon including a box generally designated 10 mounted on a chassis or frame generally designated 11 for rearward tilting motion about the axis of a stub shaft 12. The frame 11 includes a rear axle 13 at the sides of which are mounted wheels 14. The box 10 may be tilted by a hydraulic cylinder and piston rod unit in a conventional manner.

The dump box 10 includes two sides, one of which is designated 16 in FIG. 1, a bottom 17 (see FIG. 2) and a rear gate 18 which is hinged at its upper edge, for rotation about pins 19, as seen in FIG. 5.

A bar 21 is mounted by means of brackets 22 to extend transversely across the outside of the rear gate 18. The rod 21 is dimensioned so that its end portions extend beyond the sides 16 of the dump box to provide a bolt or extension designated 23 in FIG. 1.

A latching member 25 is pivotally mounted at 26 to a mounting plate 27 fixed to each side 16 of the dump box.

The latch member 25 is formed to define an outwardly extending groove 30 which receives the bolt portion 23 of the rod 21 when the latch member 25 is in the raised or latching position, as seen in FIG. 4. As will be discussed in more detail below, the latch member 25 is movable between a latching position (FIG. 4) in which it engages the bolt portion 23 to secure the rear gate 18 in the closed position, and an open position (FIG. 5) in which the rear gate 18 is free to swing open relative to the box 10.

A swing 31 is connected between the latch member 25 as at 32 and the side 16 of the box 10, as at 32 and the side 16 of the box 10, as at 33 for urging the latch member 25 to the upward or latching position shown in FIG. 4. The latch member 25 is lowered to the release position shown in FIG. 5 against the action of spring 31 by means of a first link 35. The lower portion of the link 35 is connected to an eye-bolt 36 which is fastened to a U-shaped bracket 37.

The lower portion of the U-sahped bracket 37 is fitted with a bolt 38 which is received in an elongated slot 39 of a crank arm 40.

The crank arm 40 is mounted to the outboard end of a rotatable shaft 41 (see FIGS. 2 and 3) which extends transverse of the box 10 of the dump wagon.

Figure 3:
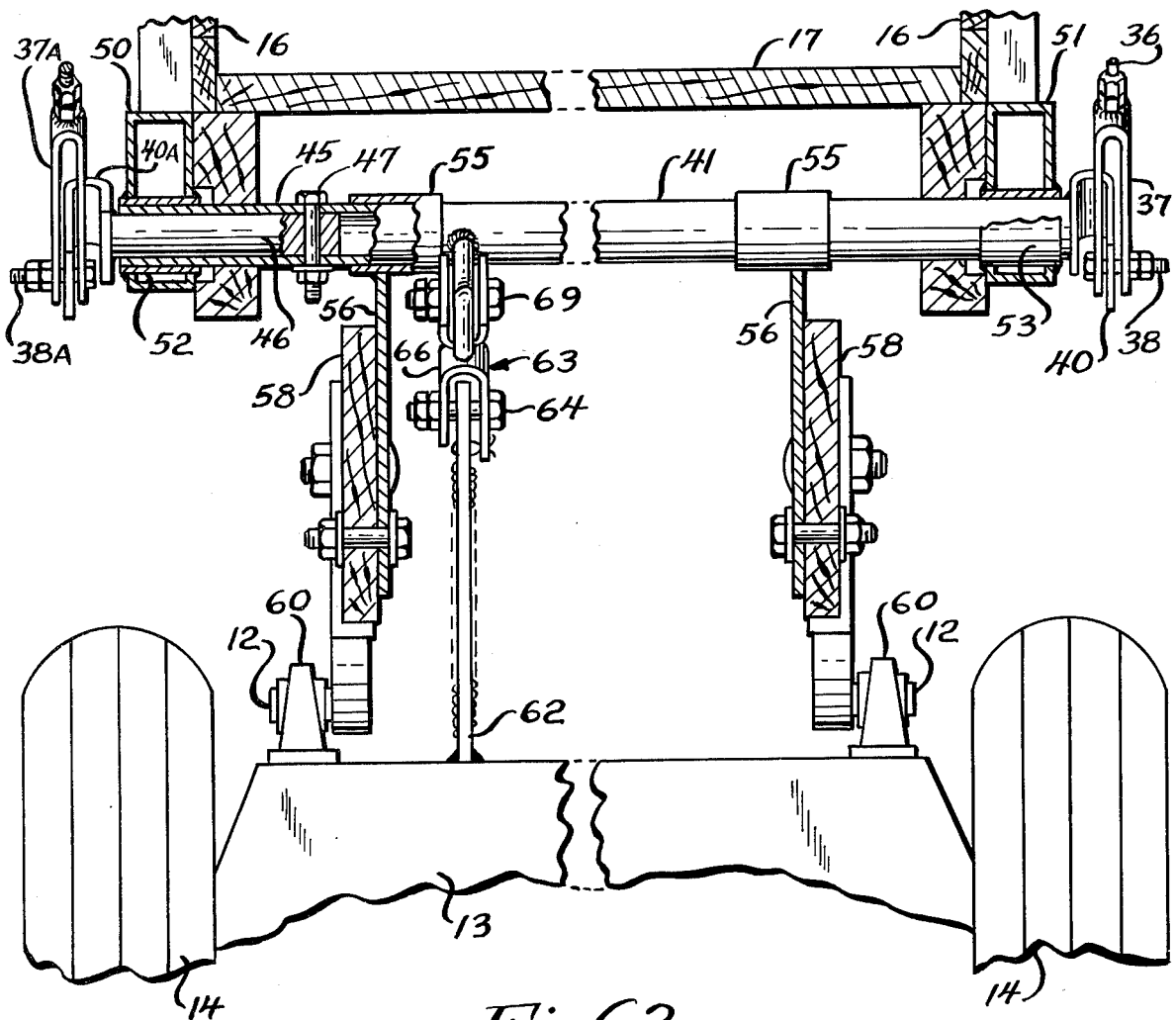
FIG. 3 is a vertical cross-sectional view taken transverse of the dump box and generally parallel to the rotatable shaft, along the section line 3—3 of FIG. 2.

As best seen in FIG. 3, the left side of the shaft 41 is similarly provided with a slotted crank arm 40A, a bolt 38A received through the slot and through a U-shaped bracket 37A. Although not seen in the drawing, the bracket 37A is provided with an eye-bolt similar to that designated 36 in FIG. 5, and a link similar to that designated 35, which is connected to a latch member 25A for coupling to the other side of the rod 21. By thus providing latch member 25, 25A for securing both ends of te rod 21, the rear gate 18 is securely held in the closed position.

Still referring to FIG. 3, the shaft 41, in the illustrated embodiment, is provided in two telescoping sections including an outer tubular member 45 and an inner rod 46 which are secured together by means of a bolt 47 fitted through aligned apertures in the tube 45 and the rod 46. The bracket 40 is welded to one end of the tube 47, and the bracket 40A is welded to the outboard end of the rod 46. This construction is designed to facilitate retrofit installation of the latching mechanism of the present invention on an existing dump wagon. Other arrangements could equally well be employed by the manufacturer of the dump wagon or for dump wagons of different construction.

The dump wagon of the illustrated embodiment includes first and second tubular frame member 50, 51 which are provided respectively with bushings 52, 53 for rotatably mounting the shaft 41. The shaft 41 is further supported by a pair of sleeves or collars 55 which are welded to braces 56 which, in turn, are bolted to the joists 58 of the underbody of the box. It is the joists 58 which are provided with the stub shafts 12 rotatably received in bearing blocks 60 mounted on the frame 13 for rotating the box to discharge the contents (see FIGS. 2 and 3).

Referring now to FIGS. 2–5, a bracket 62 is welded to the frame 13 for the construction of the illustrated embodiment. In other constructions, it may be possible to mount the bracket 62 or its equivalent elsewhere on the vehicle's frame. In this sense, "frame" refers to the portion of the wagon which does not move during a dumping action.

A second link generally designated 63 is pivotally connected to the top of the bracket 62 by means of a bolt or pin 64 at one end. The link 63 includes a threaded bolt 65 in the center and first and second U-shaped brackets 66, 67 at either end. The U-shaped bracket 66 receives the bolt 64 for mounting to the vertical bracket 62 as disclosed above.

Figure 2:
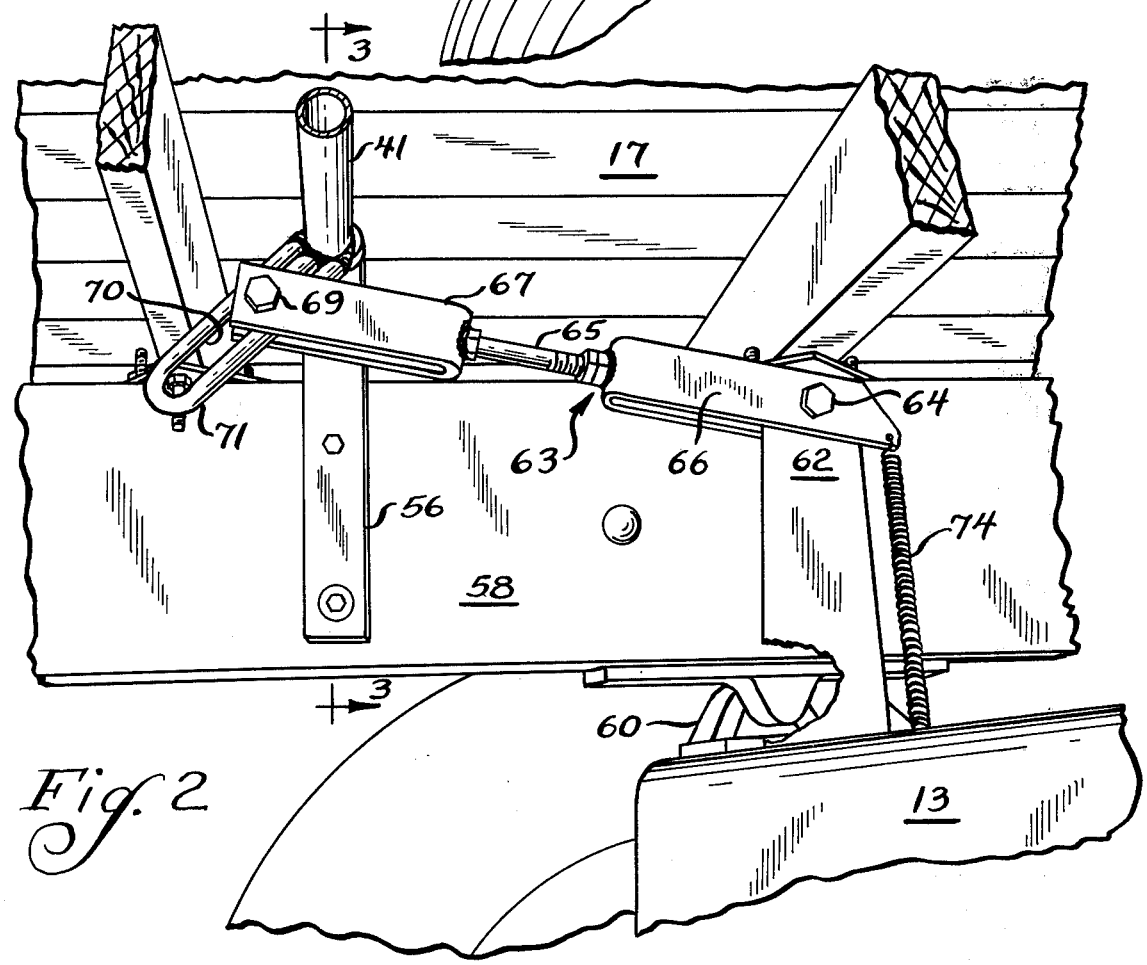
FIG. 2 is a lower perspective cutaway view from beneath the dump box of the apparatus of FIG. 1, showing the actuator link.

The second U-shaped bracket 67 of the link 63 is provided with a bolt 69 which is received in a slot 70 defined by a U-bolt 71 welded to the shaft 41 (see FIG. 2 particularly). Thus, the U-bolt 71 will cause the shaft 41 to rotate counterclockwise, as viewed from the left side of the wagon, when the U-bolt 71 is pulled forwardly during a dumping action, as will be described. The bolt or pin 69 is free to slide within the slot 70 during this action. The forward end of the second link 63 is connected to a spring 74, the other end of which is connected to the frame 13 to bias the link 63 such that the distal end (containing the pin 69) is urged upwardly in the slot 70.

Reference is made now to FIGS. 4 and 5 for an understanding of the operation of the latching mechanism and the automatic release upon tilting. When the box 10 of the dump wagon is in the horizontal position, the spring 31 urges the latch members 25, 25A in the latching position shown in FIG. 4 wherein the protruding ends 23 of the rod 21 are received in and held by the grooves 30 of the latch members. In this position, the axis of the shaft 41 is in the position shown at 80 in FIG. 4, and the slot 70 in which the second link 63 rides is at an angle of approximately minus 115 degrees relative to the axis 80. Further, the brackets 40, 40A are in a generally horizontal position relative to the axis 80 of the shaft 41.

When the dump body is tilted rearwardly for discharge, it rotates about the axes of the stub shafts 12, which are collinear and indicated by reference numeral 81 in FIG. 4. In the ensuing motion, the following relationships maintain:

1. The axis 80 of the shaft 41 travels along the arch designated 85 (that is, it rotates about the axis 81).
2. The axis of the pin 69 travels in the arc defined by the curved line 86 (that is, it rotates about the axis of pin 64).
3. The axis of the pin 38 travels along an arch designated 87 which is much smaller than either arc 85 or arc 86 because it rotates about the axis 80 of the shaft 41.

Thus, as the box is tilted to the position of FIG. 5, the axis 80 of the shaft 41 moves rearwardly along the arc 85. The pin 69, on the other hand, is constrained by attachment of the link 63 to the bracket 62 which is mounted to the chassis. Hence, the elongated U-bolt 71 is held by the link 63, and the shaft 41 is caused to rotate, thereby rotating the crank arms 40, 40A in a counterclockwise direction to draw the first link 35 downwardly and rapidly release the protruding ends 23 of the cross bar 21. Thus, the gate 18 is free to swing rearwardly, and the contents of the box, when discharged, will cause an even further opening of the gate.

From the above, it will be observed that it is important that the location of the pin 64 be displaced, preferably upwardly, of the axis of rotation 81 of the box 10. This is because the differential motion between the arc 85 and the arc 86 is what causes the rotation of the crank arms in drawing the latch members 25, 25A open in a quick-release action.

The slot 39 in the bracket 40 is provided so that the pin 38 may ride upwardly upon fill tilt of the wagon without binding or causing stress in the mechanism. Similarly, the slot 70 of the elongated U-bolt 71 permits the pin 69 to ride to the distal end of the slot 70 under full tilting motion without causing a bind in the mechanism.

Having thus described in detail a preferred embodiment of the invention, persons skilled in the art will be able to modify certain of the structure which has been disclosed and to substitute equivalent elements for those illustrated while continuing to practice the principle of the invention; and it is, therefore, intended that all such modifications and substitutions be covered as they are embraced within the spirit and scope of the appended claims.

I claim:

1. In combination with a dump vehicle having a box with an openable end gate, said box carried by a wheeled frame, and rearwardly tiltable about a first horizontal axis, the improvement comprising: latch means pivotally mounted to said box for movement between an open position and a latching position, said latch means engaging and coupling to said gate in the latching position; a shaft extending transverse of said box and rotatably mounted thereto at a location rearward of said tilt axis; first link means connected between said shaft and said latch means for moving said latch means between said open and latching positions when said shaft is rotated; second actuator link means having one end connected to said shaft; and means for pivotally mounting the other end of said actuator link means to said frame at a location above said tilt axis; whereby as said box is tilted to the rear said shaft will rotate in a first arc about said tilt axis and said one end of said actuator link means will rotate about a second arc centered at the pivotal connection of said other end of said actuator link means to rotate said shaft and thereby move said latch means to said open position and release said end gate in quick release motion.

2. The apparatus of claim 1 further comprising spring means connected between said dump box and said latch means for urging said latch means into said latching position.

3. The apparatus of claim 1 wherein said shaft extends to both sides of said box, and wherein said latch means comprises first and second latch members pivotally connected respectively to the sides of said box, said first link means comprising a first and a second link connected respectively between the ends of said shaft and said first and second latch members.

4. The apparatus of claim 3 further comprising first and second rod portions fixed to said gate and extending to either side thereof for engagement by said first and second latch members respectively.

5. The apparatus of claim 1 further comprising a crank arm defining an elongated slot connected to one end of said shaft and slidably receiving one end of said first link means in said slot.

6. The apparatus of claim 1 wherein said apparatus further comprises means connected to said shaft providing an elongated slot, and wherein said one end of said second actuator link means is connected in said slot.

7. The apparatus of claim 1 wherein said second actuator link means includes first and second end brackets pivotally connected respectively to said shaft and to said pivotal mounting means, and a bolt threadedly received in said first and second end brackets.

* * * * *